United States Patent
Stopa (10) Patent No.: US 6,931,736 B2
(45) Date of Patent: Aug. 23, 2005

(54) METHOD OF AND APPARATUS FOR THE INSPECTION OF VEHICLE WHEEL ALIGNMENT

(75) Inventor: Garry Stopa, Abbotsford (CA)

(73) Assignee: Magnum Marketing Ltd., Surrey (CA)

( * ) Notice: Subject to any disclaimer, the term of this patent is extended or adjusted under 35 U.S.C. 154(b) by 30 days.

(21) Appl. No.: 10/752,494

(22) Filed: Jan. 8, 2004

(65) Prior Publication Data

US 2004/0139620 A1 Jul. 22, 2004

Related U.S. Application Data

(60) Provisional application No. 60/438,797, filed on Jan. 9, 2003.

(51) Int. Cl.[7] ............................................. G01B 11/275
(52) U.S. Cl. ....................................... 33/203; 33/203.18
(58) Field of Search ........................... 33/203, 286, 288, 33/600, 203.12, 203.13, 203.14, 203.15, 203.16, 203.17, 203.18, 203.19, 203.2, 203.21

(56) References Cited

U.S. PATENT DOCUMENTS

| | | | |
|---|---|---|---|
| 3,566,476 A | * 3/1971 | McWhorter | 33/288 |
| 4,106,208 A | * 8/1978 | Hunter | 33/288 |
| 4,416,065 A | * 11/1983 | Hunter | 33/203.15 |
| 5,535,522 A | 7/1996 | Jackson | |
| 5,675,515 A | 10/1997 | January | |
| 5,724,128 A | 3/1998 | January | |
| 6,148,528 A | * 11/2000 | Jackson | 33/288 |
| 6,298,284 B1 | 10/2001 | Burns, Jr. | |
| 6,404,486 B1 | * 6/2002 | Nobis et al. | 33/203.18 |
| 6,498,959 B1 | * 12/2002 | January et al. | 33/227 |
| 2002/0189115 A1 | * 12/2002 | Jackson et al. | 33/286 |
| 2004/0083025 A1 | * 4/2004 | Yamanouchi et al. | 700/213 |

* cited by examiner

Primary Examiner—G. Bradley Bennett
(74) Attorney, Agent, or Firm—Brian M. Long (57) ABSTRACT

An apparatus and a method for inspecting wheel alignment employ an optical target mounted on a wheel of a motor vehicle, a support mounting a camera above ground for generating image information of the optical target that falls within the camera's field of view, and a pivotal connection between the camera and the support,. The pivotal connection allows vertical pivotation of the camera through a range of pivotation sufficient to maintain the target in the field of view of the camera during displacement of the vehicle between raised and lowered positions of a vehicle lift carrying the vehicle. Images of the target captured by the camera are analysed to generate wheel alignment information.

19 Claims, 8 Drawing Sheets

METHOD OF AND APPARATUS FOR THE INSPECTION OF VEHICLE WHEEL ALIGNMENT

CROSS-REFERENCE TO RELATED APPLICATION

This is a complete patent application based on Provisional Patent Application No. 60/438,797, filed Jan. 9, 2003.

BACKGROUND OF THE INVENTION

1. Field of the Invention

The present invention relates to a method of and an apparatus for the inspection of vehicle wheel alignment and, more particularly, to methods and apparatus using cameras for the inspection of vehicle wheel alignment.

2. Description of the Related Art

In U.S. Pat. No. 5,535,522, issued Jul. 16, 1996 to Bernie F. Jackson, there is disclosed an apparatus for determining the alignment of a motor vehicle's wheels which comprises optical sensing means such as a pair of video cameras, an electronic processing means connected to the optical sensing mean, targets which either form parts of the wheels or are attached thereto and a display for indicating the detected alignment. In operation of this prior art system, the cameras are employed to provide images of the targets on the wheels, and the images are processed by the electronic processing means to provide an indication of the alignment or misalignment of the wheels.

Such inspection requires the targets to be kept within the fields of view of the cameras. However, during the correction of the alignment of the wheels of a vehicle, it is usually necessary to perform work underneath the vehicle and also at e.g. waist height. Consequently, it is necessary to raise and lower the vehicle. This has required corresponding raising and lowering of the cameras. For this purpose, the cameras were normally mounted on a boom provided with a hydraulic or other means for raising and lowering the boom and, therewith, the cameras.

This arrangement has a number of disadvantages. Firstly, the provision of the cameras with a camera boom and the means for raising and lowering the camera boom are relatively expensive, and considerable energy is utilized in raising and lowering the boom. Also, when the camera boom is in a lowered position, it becomes a hazard for people who risk walking into the boom and knocking their heads on the boom. Lowering of the camera boom produces the hazard that something or someone might be accidentally crashed below the boom. In addition, since it is necessary to leave an area free below the boom, that area is wasted.

BRIEF SUMMARY OF THE INVENTION

It is accordingly an object of the present invention to provide a novel and improved method of and apparatus for the inspection of vehicle wheel alignment which avoids the use of a camera boom which has to be raised and lowered.

According to the present invention, there is provided a vehicle wheel alignment inspection apparatus which comprises at least one camera, and preferably a pair of cameras, for generating image information by viewing one or more optical targets mounted on one or more wheels of a vehicle, a data processing apparatus responsive to the image information from the camera or cameras for generating wheel alignment information, and a camera tilt mechanism connected to the or each camera.

In operation of the present apparatus, the vehicle is raised and lowered on a vehicle lift to enable work to be performed under the vehicle and at e.g. waist height, and the or each camera is correspondingly tilted such that the field of view always includes the optical targets mounted to the vehicle wheels.

The camera tilt mechanism may be manually operable or, alternatively, may be pneumatically, hydraulically or electrically driven.

In a preferred embodiment of the invention, the camera tilt mechanisms is pneumatically operated, and uses compressed air lines which are commonly available in vehicle service bays.

Means for pneumatically tilting the cameras may be linked to a pneumatic system for operating the vehicle lift used to raise and lower the vehicle under test, so that operation of the vehicle lift automatically and simultaneously operates the camera tilting mechanism.

A pair, or two pairs, of the cameras may be mounted on a camera boom so as to be movable laterally of the cameras, i.e. in the longitudinal direction of the camera boom, from one service bay to another. In this way, the apparatus according to the present invention can be readily adapted for use in a plurality of different service bays in side-by-side applications. Also, the apparatus can be mounted to a support beam that pivots about the vertical axis. In this way, the apparatus according to the present invention can be readily adapted for use in face-to-face service bay applications.

The present invention also provides a method of vehicle wheel alignment inspection which employs at least one camera for generating image information by viewing a target mounted on a wheel of a vehicle and, in response to the image information from the cameras, generating wheel alignment information, and which includes the step of tilting or pivoting the camera or cameras in accordance with raising and lowering of the vehicle to maintain the target in a filed of view of the camera.

BRIEF DESCRIPTION OF THE DRAWINGS

The invention will be more readily understood from the following description of preferred embodiments thereof, which are given by way of example only, and which are illustrated in the accompanying drawings, in which.

DESCRIPTION OF THE PREFERRED EMBODIMENTS

Figure 1:
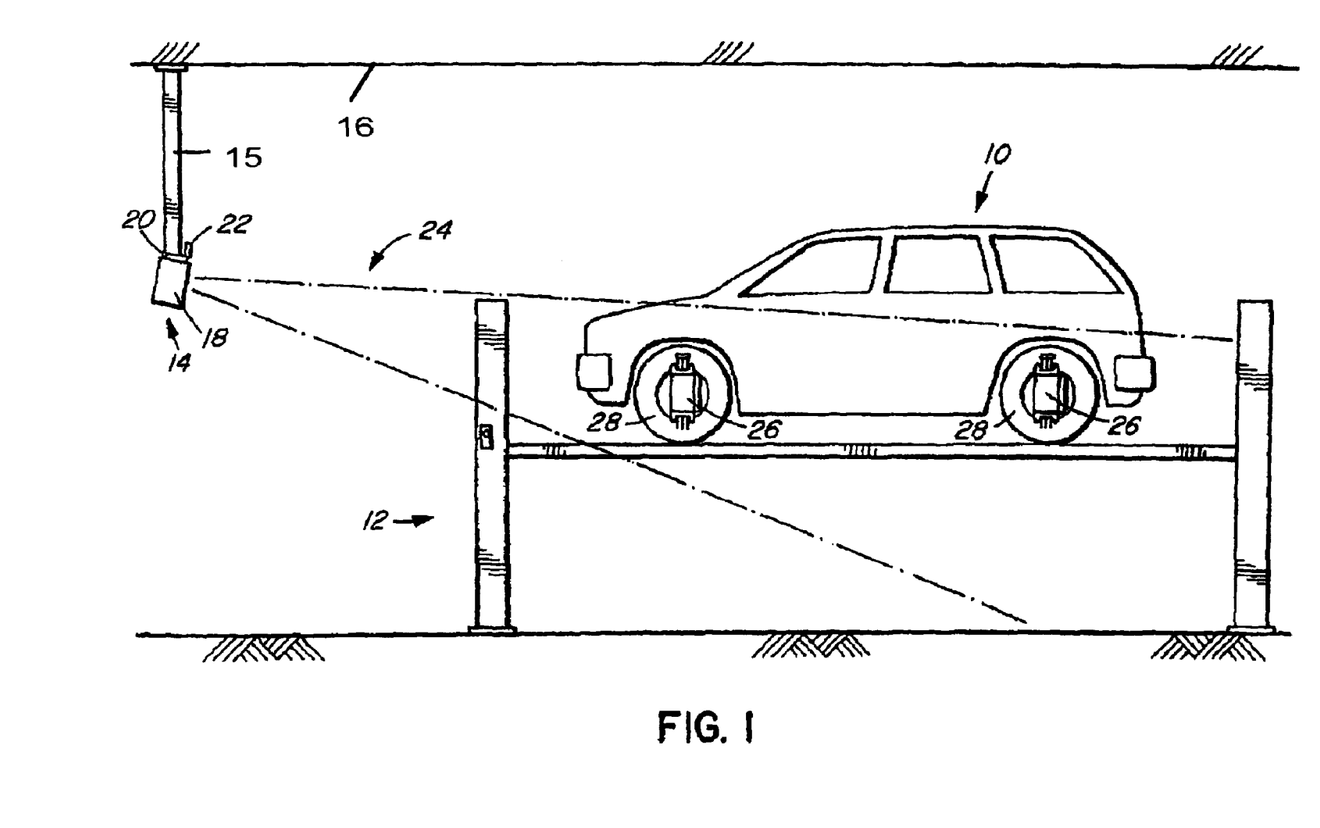
FIG. 1 shows a view in side elevation of a pneumatically operated vehicle wheel alignment apparatus according to the present invention in use with a vehicle elevated into a raised position on a vehicle lift.
Figure 2:
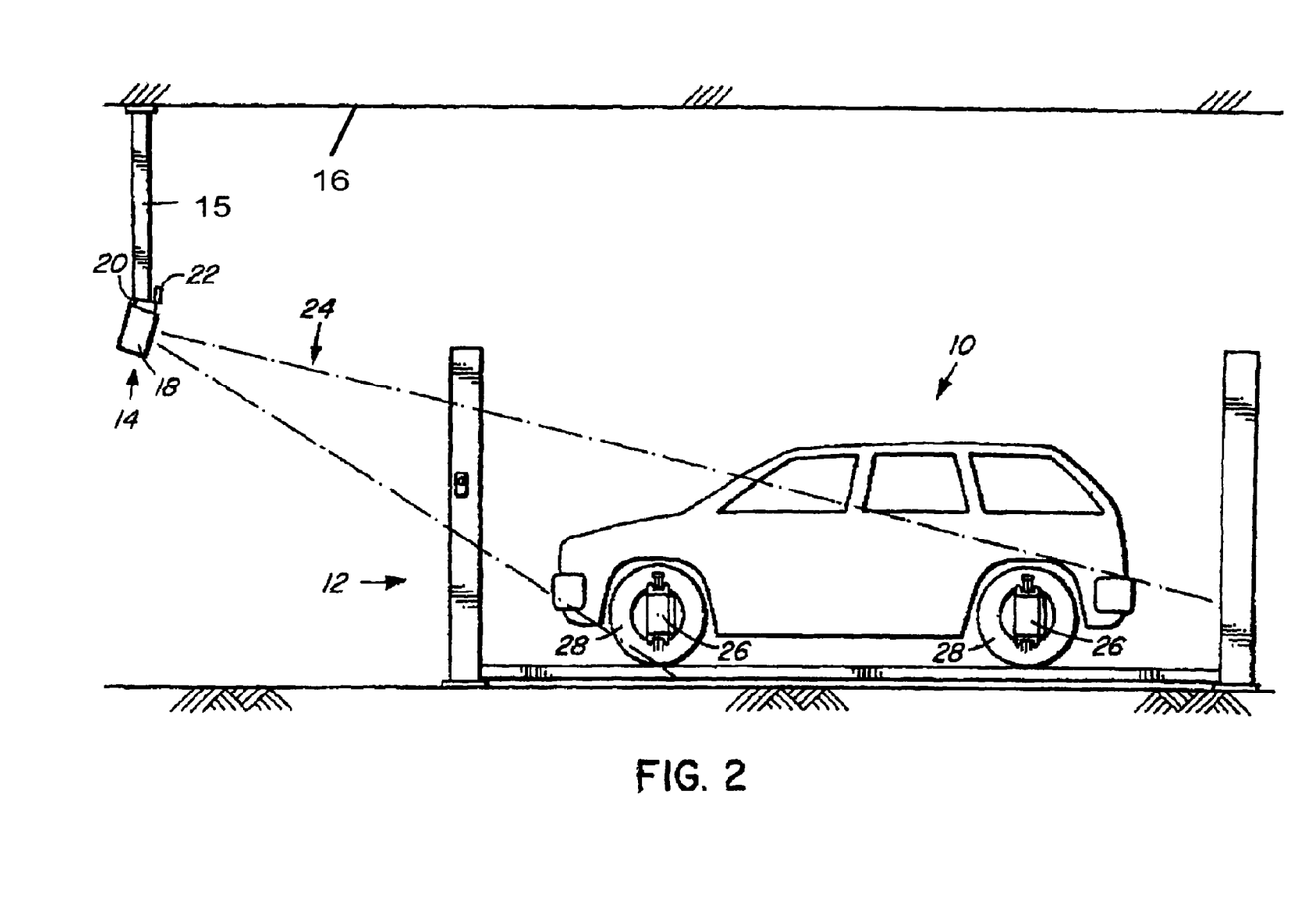
FIG. 2 shows a view corresponding to that of FIG. 2, but with the vehicle lift retracted to move the vehicle into a lowered position.

Referring now to the accompanying drawings, FIGS. 1 and 2 show a motor vehicle, indicated generally by reference numeral 10, carried on a vehicle lift system, indicated generally by reference numeral 12, for inspection by a pneumatically operated vehicle wheel alignment inspection apparatus indicated generally by reference numeral 14.

Figure 6:
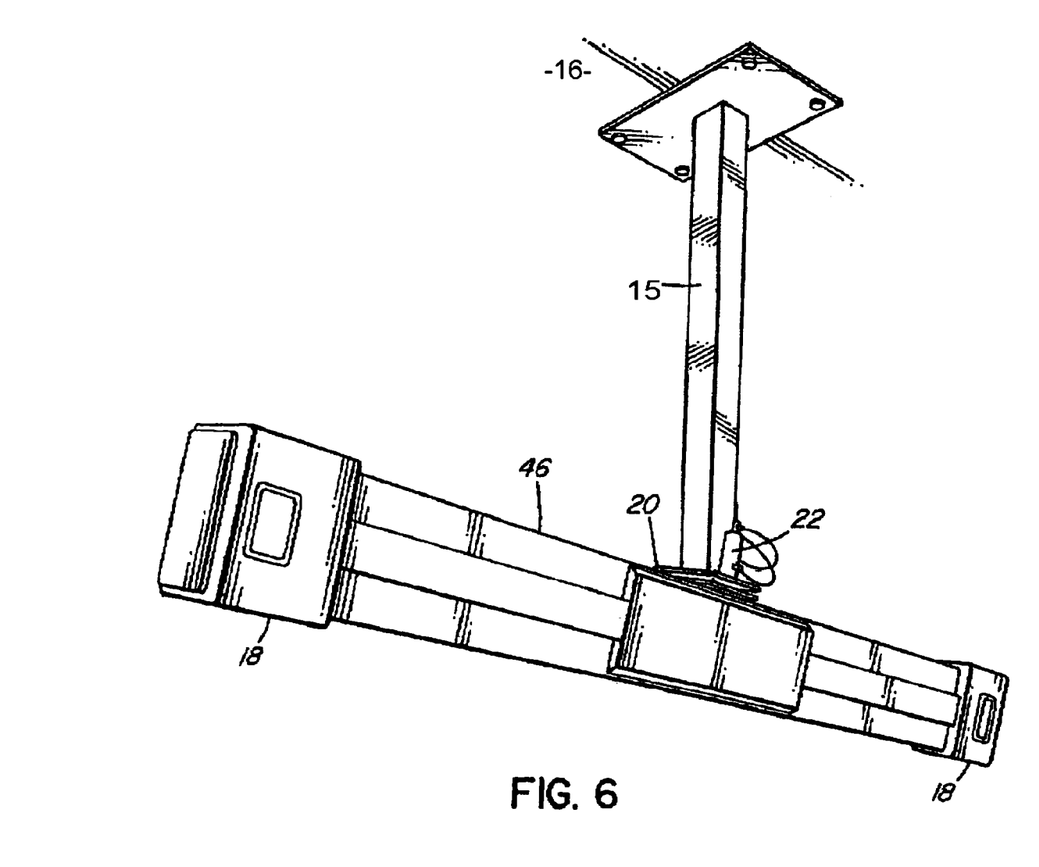
FIG. 6 shows a perspective view of a pair of cameras mounted on a camera boom supported by a camera tilt mechanism and forming parts of the apparatus of FIG. 1.

The inspection apparatus comprises a support in the form of a post 15 extending vertically downwardly from a ceiling 16 and carrying a horizontal camera boom 46 (FIG. 6), on opposite ends of which are mounted a pair of video cameras 18. The camera boom 46 is connected to the lower end of the post 15 by a hinge 20 which has a horizontal axis of pivotation and which therefore allows the boom 46 and therewith the cameras 18 to pivot vertically. A pneumatic cylinder 22 is connected between the post 15 and the camera boom 46 for effecting such vertical pivotation.

As shown in FIG. 1, the vehicle lift 12 is extended to raise the vehicle 10 into an elevated position, and the pneumatic cylinder 22 is in a retracted, or home position, such that fields of view 24, indicated by chain-dot lines, of the cameras 18 include optical targets 26 and wheels 28 of the vehicle 10. As shown in FIGS. 1 and 2, the optical targets 26 are on the front and rear wheels 28 at one side of the vehicle, within the field of view of one of the cameras 18, and it is to be understood that similar optical targets (not shown) are mounted on the front and rear wheels at the opposite side of the vehicle 10 within the field of view of the other camera 18.

In FIG. 2, the vehicle lift 12 has been contracted to lower the vehicle 10. A piston rod 30 (FIGS. 4 and 5) has been correspondingly extended along the longitudinal axis of the pneumatic cylinder 22 so as to deflect the field of view 24 in FIG. 1 of the camera 18 downwardly in order to maintain the targets 26 and wheels 28 within the field of view 24.

Figure 3:
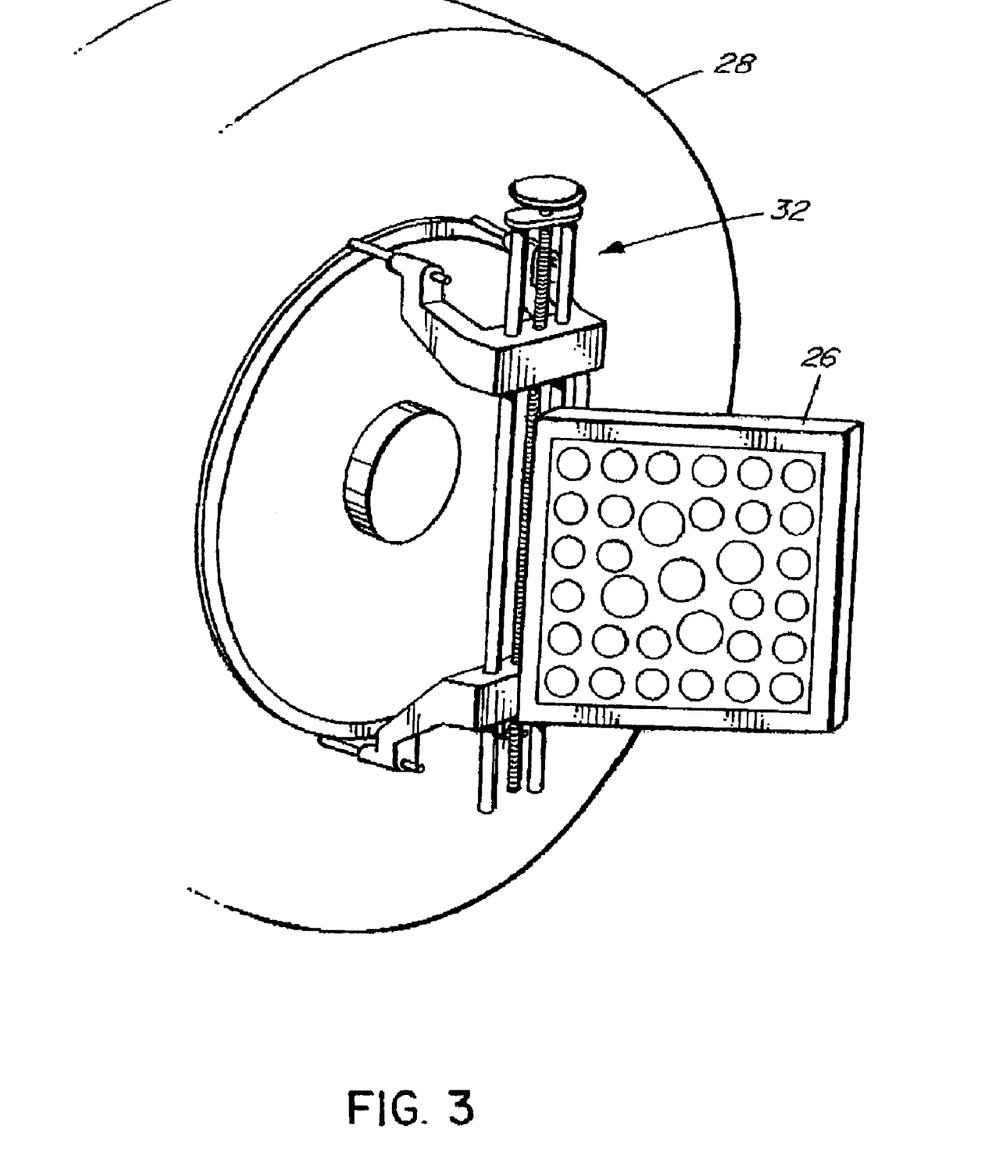
FIG. 3 shows a perspective view of an optical target mounted on a motor vehicle wheel during wheel alignment inspection.

FIG. 3 shows an expanded view of one of the optical targets 26 mounted on a motor vehicle wheel 28 by an adaptor indicated generally by reference numeral 32. The camera 18 forms a perspective image of this optical target 26 and translates this into an electrical signal.

Figure 4:
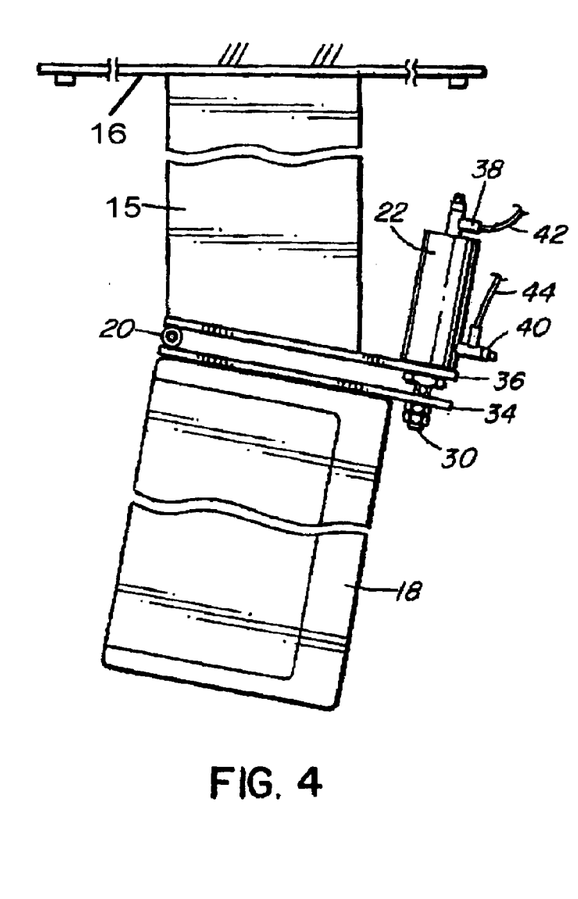
FIG. 4 shows a side view of the vehicle wheel alignment apparatus of FIGS. 1 and 2 with the camera in a home or raised position.
Figure 5:
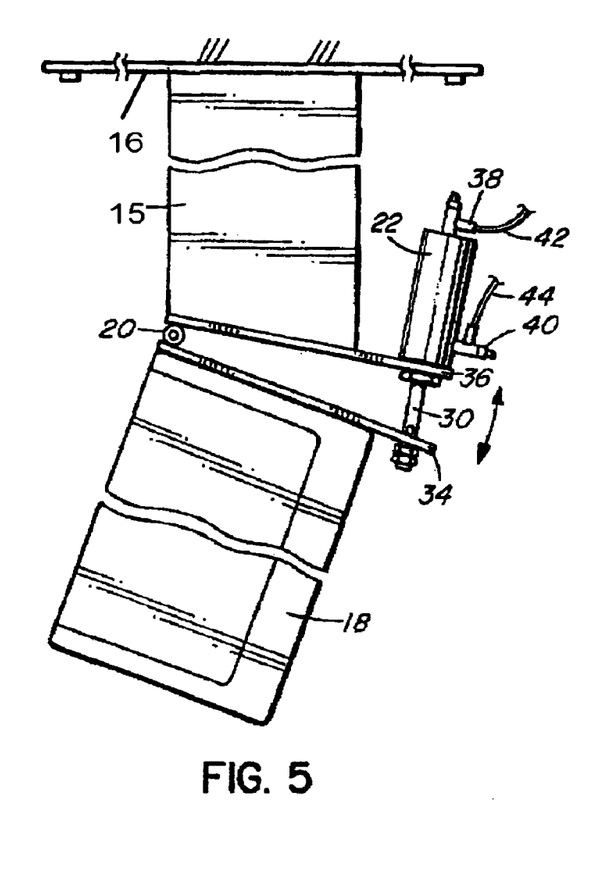
FIG. 5 shows a side view of the vehicle wheel alignment apparatus corresponding to that of FIG. 4 with the camera in a tilted position.

As can be seen in FIGS. 4 and 5, the camera 18 is pivotally connected to the lowermost end of the post 15 by means of a metal plate 34 attached to camera 18 and a metal plate 36 attached to the post 15, the hinge 20 being attached to the metal plates 34 and 36. The pneumatic cylinder 22 is mounted on and fixed to the metal plate 36 and the piston rod 30 is fixed to the metal plate 34. The pneumatic cylinder 22 has two compressed pneumatic inlets 38 and 40 attached to compressed pneumatic lines 42 and 44, respectively. The compressed pneumatic lines 42 and 44 are attached to a compressed pneumatic source (not shown) by means of valves (not shown).

FIG. 4 shows the pneumatic cylinder 22 in a neutral position with the piston rod 30 fully retracted so as to raise the boom 47 and therewith the cameras 18 into raised positions corresponding to the raised elevation of the vehicle 10 on the lift 12 as shown in FIG. 1.

When the vehicle 10 is lowered by the lift 12, the camera 18 must be adjusted to maintain the optical targets 26 within the fields of view 24. To accomplish this, compressed air is supplied through the pneumatic inlet 38, causing piston 30 to extend along the longitudinal axis of the pneumatic cylinder 22, and simultaneously air is exhausted through the pneumatic inlet 40, causing a low pressure and allowing the extension to take place. The piston rod 30 is allowed to reach its maximum stroke, at which point the pneumatic cylinder 22 and piston rod 30 are again in a rest position. The cameras 18 are now adjusted so that their fields of view include the optical targets 26 of the lowered vehicle 10.

When the vehicle 10 is raised by the lift 12, a corresponding adjustment needs to be made to the cameras 18. In this situation, compressed air is supplied though the inlet 40 while air is exhausted through the inlet 38, forcing the piston rod 30 to contract into the pneumatic cylinder 22. Again, the piston rod 30 is allowed to reach it's maximum bore at which point the piston rod 30 is in a rest position with pneumatic cylinder 22.

Figure 7:
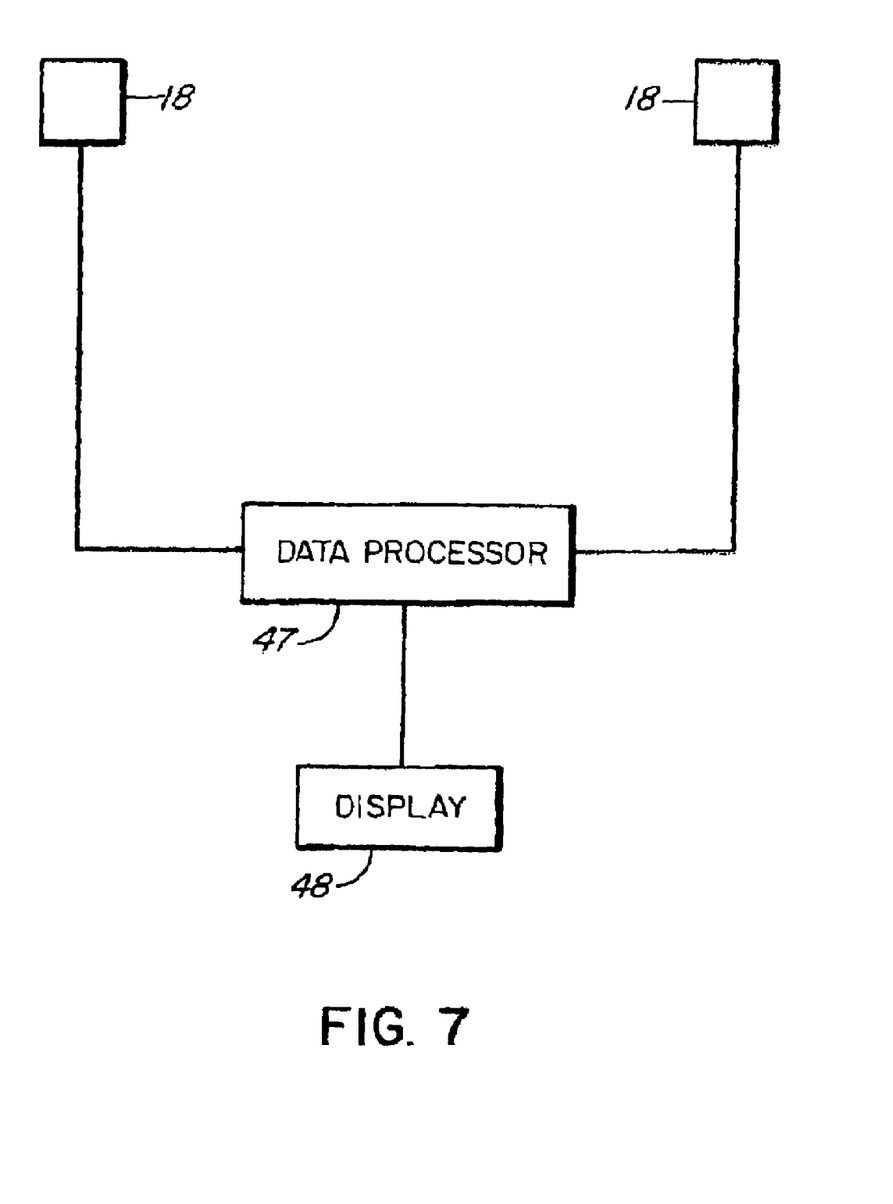
FIG. 7 shows a block diagram of a pair of cameras and an associated data processor and display.

In the above-described embodiment of the invention, the cameras 18 are connected to a data processor 47 (FIG. 7), at which image information generated by the cameras 18 from the targets 26 is analyzed to provide wheel alignment information which, in turn, is displayed on a display 48. The cameras 18, the data processor 47, software employed by the data processor 47 and the display 48 are components of a commercially available wheel alignment system sold as the V3D Wheel Alignment System by John Bean Company, of Arkansas, and are therefore not described herein in greater detail. Alternatively, the wheel alignment system sold by Hunter Engineering Company, of St. Louis, Mo. as DSP 400 or DSP 600 Wheel Alignment System, or any other suitable system, may be employed.

The above-described pneumatic camera tilting system may be connected to the pneumatic system of the vehicle lift 12 so that the cameras are automatically tilted when the vehicle is raised or lowered.

Instead of employing a pneumatically operated tilting device as described above, it is alternatively possible to employ an hydraulically or electrically operable device for tilting the cameras 18.

Figure 8:
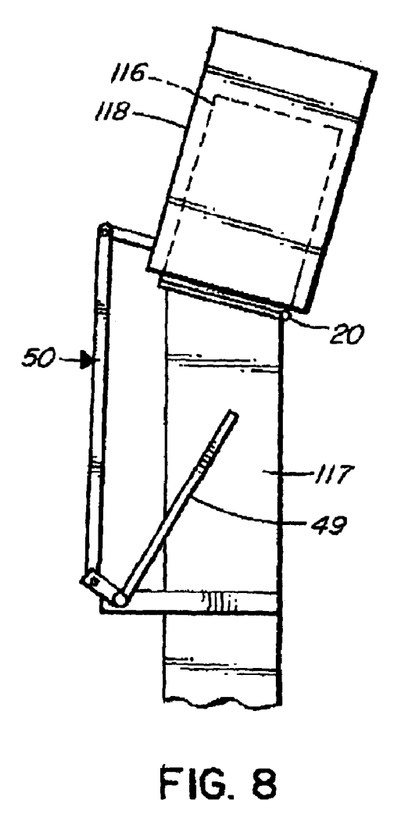
FIGS. 8 and 9 show views in side elevation of a manually operated camera tilt mechanism with a camera in two different positions.
Figure 9:
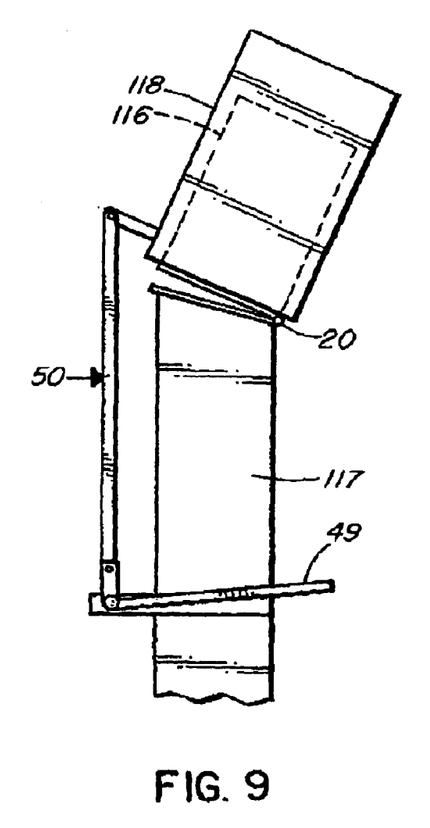

Another method and apparatus for tilting cameras 118, (only one of which is shown), mounted on opposite ends of a camera boom 116 which is supported on the top of a post 117, makes use of a manually operated handle 49, as shown in FIGS. 8 and 9. The handle 49 is connected to the boom 116, which is pivotally mounted on its post 117 so as to be vertically pivotable, i.e. pivotable about a horizontal axis, by a lever linkage, which is indicated generally by reference numeral 50.

FIG. 8 shows the position of one of the cameras 118 during inspection of a vehicle which has been raised by a lift (not shown), corresponding to the situation of the vehicle 10 in FIG. 1. The handle 49 has been correspondingly pivoted upwardly to tilt the boom 116 and the cameras 118 so that targets (not shown) are within the fields of view of the cameras.

In FIG. 9, the handle 49 has been lowered to tilt the boom 116 and the cameras 118 so as to deflect the fields of view 24 of the cameras 118 downwardly when the vehicle is lowered by the lift.

Figure 10:
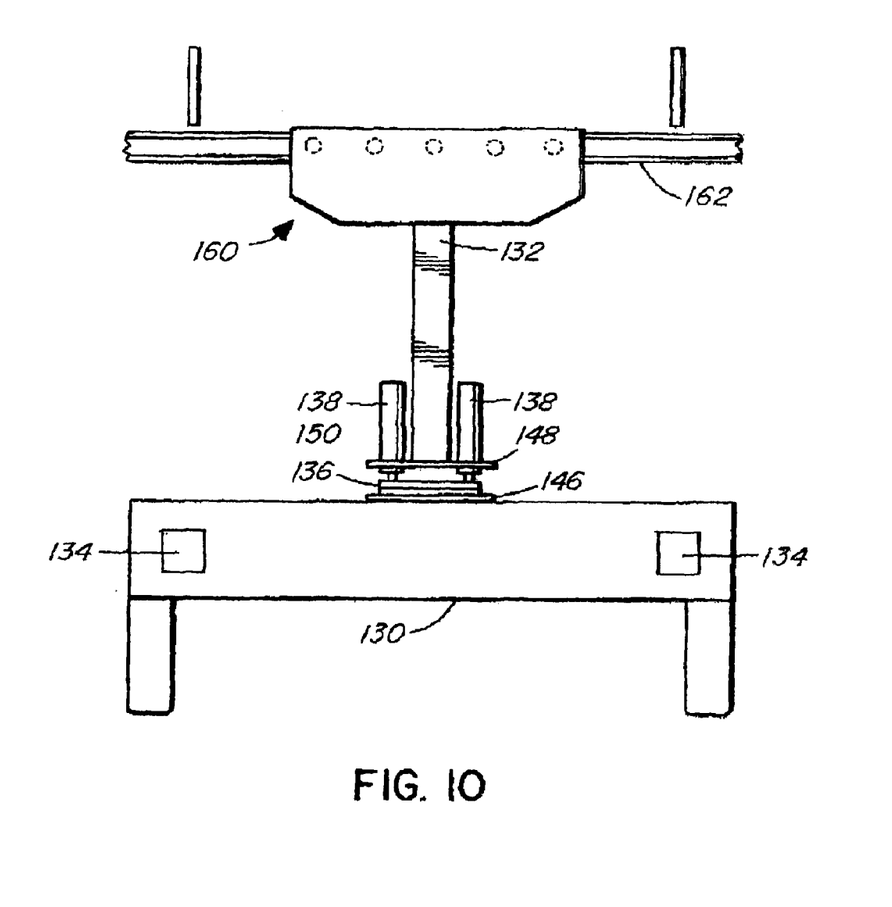
FIG. 10 shows a view in front elevation of a camera boom mounted on an overhead.

FIG. 10 shows a further modified wheel alignment inspection apparatus. In FIG. 10, a boom 130 carrying a pair of cameras 134 is suspended from the lower end of a horizontally displaceable vertical member 132 by a hinge and pneumatic cylinder arrangement which is similar to that of FIGS. 4 and 5.

More particularly, the boom 130 is connected to the lower end of the vertical member 132 by a hinge 136 between a pair of plates 146 and 148, with a pair of pneumatic cylinders 138 for causing relative pivotation of the plates 146 and 148, and thereby tilting of the boom 130 and the cameras 134.

The upper end of the vertical member 132 is connected to a trolley indicated generally by reference numeral 160, which can run to and from along a track 162 in a direction parallel to the longitudinal axis of the boom 130 in order to move the boom 130 and its cameras 134 from one service bay to another.

In this embodiment of the invention, the track 162, the trolley 160, the vertical member 132 all serve as components of a support for the cameras 134.

As will be apparent from the above description of the preferred embodiments of the present invention, the present apparatus and method have the advantage that they enable the field of view of the cameras to be varied vertically without the expense or hazards of prior art systems employing vertically displaceable camerabooms requiring camera lifting devices, this being achieved according to the present invention by tilting the cameras.

As will be apparent to those skilled in the art, various modifications may be made to the above-described embodiments of the present invention.

For example, the present method and apparatus may be modified to employ two pairs of cameras, at opposite ends of the vehicle under test, and may alternatively employ three cameras or only a single camera.

Also, the tilting of the camera or cameras or of the camera boom may be controlled automatically, in accordance with the raising and lowering of the vehicle, by the use of image seeking technology.

What is claimed is:

1. A wheel alignment inspection apparatus for inspecting the alignment of motor vehicle wheels, said apparatus comprising:
   a. an optical target adapted to be mounted on a wheel of a motor vehicle,
   b. a camera for generating image information of said optical target that falls within said camera's field of view,
   c. a support mounting said camera above ground, such that the field of view of said camera includes said optical target,
   d. a pivotal connection between said camera and said support, said pivotal connection allowing vertical pivotation of said camera,
   e. data processing means connected to said camera for analysing images of said optical target and generating wheel alignment information therefrom,
   f. display means connected to said data processing means for displaying the generated wheel alignment information,
   g. a vehicle lift carrying the vehicle, and
   h. means for effecting the vertical pivotation of said camera through a range of pivotation sufficient to maintain said target in the field of view of said camera during displacement of the vehicle between raised and lowered positions of said vehicle lift.

2. The wheel alignment apparatus of claim 1 wherein said support is a post supported from a ceiling, said camera being mounted on said post by said pivot means.

3. The wheel alignment apparatus of claim 2 wherein said support comprises a camera boom, said camera is one of a pair of cameras mounted on said boom so that the fields of view of said cameras are on opposite sides of the vehicle and said pivot means connects said boom and said post.

4. The wheel alignment apparatus of claim 3 wherein said means for effecting the vertical pivotation of said camera boom comprises a manually operable mechanism.

5. The wheel alignment apparatus of claim 3 wherein said means for effecting the vertical pivotation of said camera boom is a pneumatically driven means.

6. The wheel alignment apparatus of claim 3 including an overhead track carrying said support, whereby said wheel alignment apparatus can move laterally for side-by-side vehicle bay applications.

7. The wheel alignment apparatus of claim 1, wherein said support includes a displaceable member carrying said camera.

8. The wheel alignment system as claimed in claim 1, wherein said support comprises a track and a displaceable member movable along said track and carrying said camera.

9. A method of inspecting the alignment of a wheel of a vehicle, comprising the steps of:
   attaching an optical target to the wheel;
   directing a field of view of a camera to the target to generate image information from the target;
   raising and lowering the vehicle on a vehicle lift;
   pivoting the camera vertically to maintain the target in the field of view of the camera during the raising and lowering of the motor vehicle on the vehicle lift;
   processing that the generated image information to provided wheel alignment information indicative of the alignment of the wheel; and
   displaying the alignment information.

10. A method as claimed in claim 9, which includes displacing said camera to direct the field of view of said camera to different vehicle bays.

11. The method of claim 10, in which the step of displacing said camera includes moving said camera along a path of travel from one of the vehicle bays to another of the vehicle bays.

12. A wheel alignment inspection apparatus for inspecting the alignment of motor vehicle wheels, said apparatus comprising:
   an optical target adapted to be mounted on a wheel of a motor vehicle;
   a camera for generating image information of said optical target that fails within said camera's field of view;
   a support mounting said camera from a ceiling, such that the field of view of said camera includes said optical target;
   a pivotal connection between said camera and said support, said pivotal connection allowing vertical pivotation of said camera;
   data processing means connected to said camera for analysing images of said optical target and generating wheel alignment information therefrom;
   display means connected to said data processing means for displaying the generated wheel alignment information;
   a vehicle lift carrying the vehicle and displacing the vehicle between raised and lowered positions, the vehicle lift allowing technicians to conveniently work underneath the vehicle when the vehicle is in the raised position; and
   means for effecting the vertical pivotation of said camera through a range of pivotation sufficient to maintain said target in the field of view of said camera during displacement of the vehicle between the raised and lowered positions of said vehicle lift.

13. The wheel alignment apparatus of claim 12, wherein the wheel alignment apparatus further includes display means connected to said data processing means for displaying the generated wheel alignment information.

14. The wheel alignment apparatus of claim 12 wherein said support comprises a camera boom, said camera is one of a pair of cameras mounted on said boom so that the fields of view of said cameras are on opposite sides of the vehicle and said pivot connection connects said boom and said post.

15. The wheel alignment apparatus of claim 14 wherein said means for effecting the vertical pivotation of said camera boom comprises a manually operable mechanism.

16. The wheel alignment apparatus of claim 14 wherein said means for effecting the vertical pivotation of said camera boom is a pneumatically driven means.

17. The wheel alignment apparatus of claim 14 including an overhead track carrying said support, whereby said wheel alignment apparatus can move laterally for side-by-side vehicle bay applications.

18. The wheel alignment apparatus of claim 12, wherein said support includes a displaceable member carrying said camera.

19. The wheel alignment system as claimed in claim 12, wherein said support comprises a track and a displaceable member movable along said track and carrying said camera.

* * * * *